US010215307B2

(12) United States Patent
Bartos

(10) Patent No.: US 10,215,307 B2
(45) Date of Patent: Feb. 26, 2019

(54) PIPE SECURING APPARATUS

(71) Applicant: Tomas Bartos, Elmhurst, IL (US)

(72) Inventor: Tomas Bartos, Elmhurst, IL (US)

(73) Assignee: HAP TECHNOLOGIES CO., Elmhurst, IL (US)

( * ) Notice: Subject to any disclaimer, the term of this patent is extended or adjusted under 35 U.S.C. 154(b) by 0 days.

(21) Appl. No.: 16/029,186

(22) Filed: Jul. 6, 2018

(65) Prior Publication Data

US 2018/0313468 A1   Nov. 1, 2018

Related U.S. Application Data

(62) Division of application No. 15/429,435, filed on Feb. 10, 2017, now Pat. No. 10,041,611.

(60) Provisional application No. 62/296,678, filed on Feb. 18, 2016.

(51) Int. Cl.
| *F16L 3/00* | (2006.01) |
| *F16L 3/02* | (2006.01) |
| *F16B 45/00* | (2006.01) |
| *F16M 13/02* | (2006.01) |
| *F16B 21/09* | (2006.01) |
| *F16B 9/00* | (2006.01) |

(52) U.S. Cl.
CPC ............... *F16L 3/02* (2013.01); *F16B 45/00* (2013.01); *F16M 13/02* (2013.01); *F16B 9/054* (2018.08); *F16B 21/09* (2013.01)

(58) Field of Classification Search
CPC .. H02G 3/32; H02G 3/22; H02G 7/053; F16L 55/035; F16L 3/00; F16L 3/26

USPC ...................................... 248/49, 65, 68.1, 73
See application file for complete search history.

(56) References Cited

U.S. PATENT DOCUMENTS

| 3,528,634 | A | * | 9/1970 | Jenkins | ..................... F16L 3/10 |
| | | | | | 248/327 |
| 3,861,315 | A | * | 1/1975 | Rypinski | ................. B61B 15/00 |
| | | | | | 104/125 |
| 5,184,792 | A | * | 2/1993 | Bernhard | .................. H02G 3/26 |
| | | | | | 248/71 |
| 6,595,471 | B1 | * | 7/2003 | Botting | ...................... F16L 3/02 |
| | | | | | 248/339 |
| 8,882,057 | B2 | * | 11/2014 | Dworak, Jr. | .......... F16L 3/1083 |
| | | | | | 248/62 |
| 9,080,691 | B2 | * | 7/2015 | Bartos | ........................ F16L 5/00 |
| 9,611,954 | B2 | * | 4/2017 | Malaspina | .............. F16L 3/137 |
| 2014/0103170 | A1 | * | 4/2014 | Zvak | ....................... F16L 3/123 |
| | | | | | 248/74.1 |

* cited by examiner

*Primary Examiner* — Steven M Marsh
(74) *Attorney, Agent, or Firm* — Justin Lampel

(57) ABSTRACT

A device for securing a pipe to a wall, including an exterior wall of a building, is provided. The device has a generally flat surface which adheres to the wall and a generally curved support unit which receives the pipe. An optional securing bar may be locked over the top of the pipe to prevent movement of the pipe. In an embodiment, the device has an extension flange which allows the pipe to be secured to the wall in an off-set manner. Preferably, a plurality of the present aligned devices secure the pipe to the wall in a horizontal or vertical manner. The device allows the pipe to be secured to a wall in compliance with governmental regulations. An adapter unit may be inserted over the curved support unit for one or more smaller pipes.

1 Claim, 9 Drawing Sheets

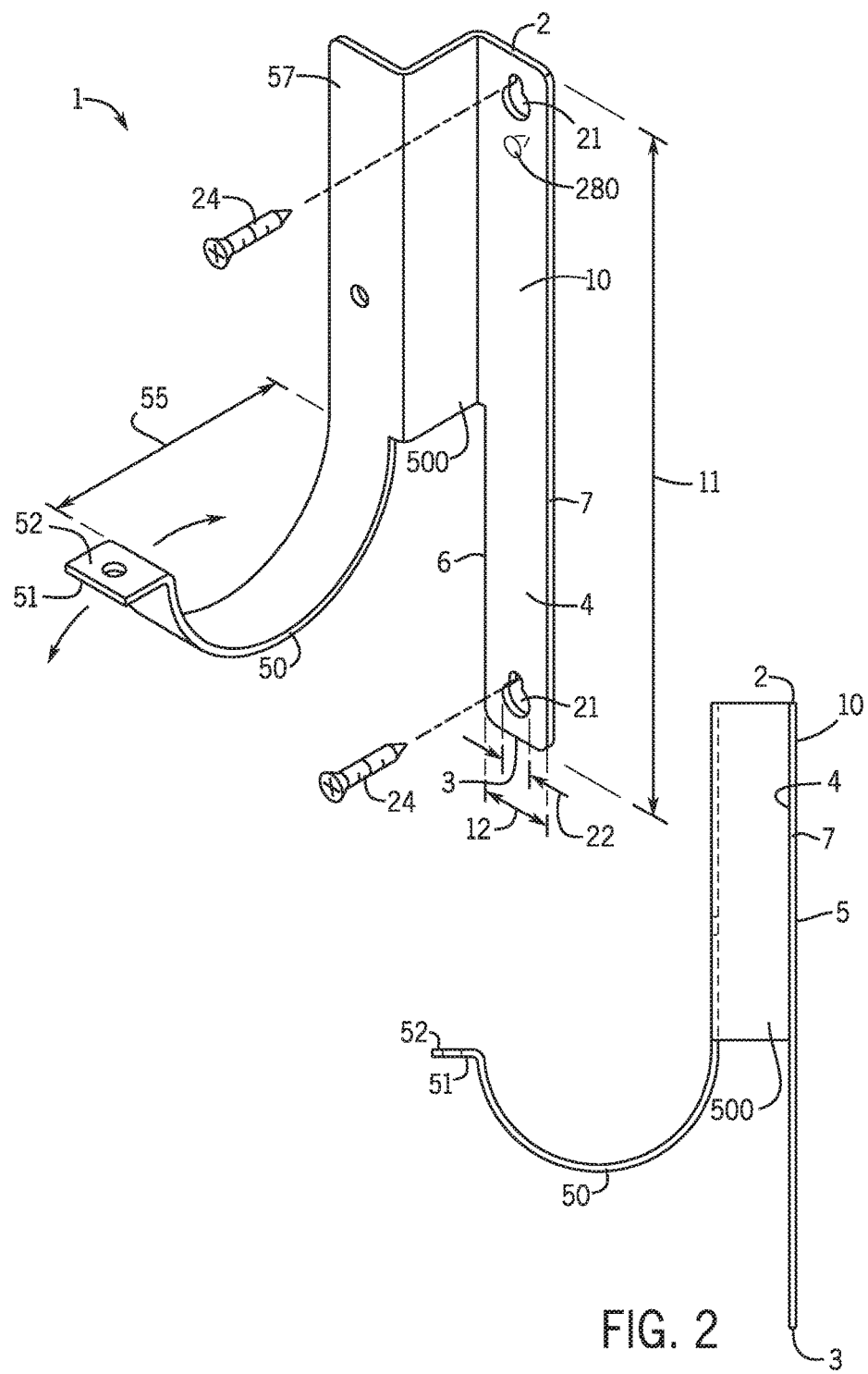

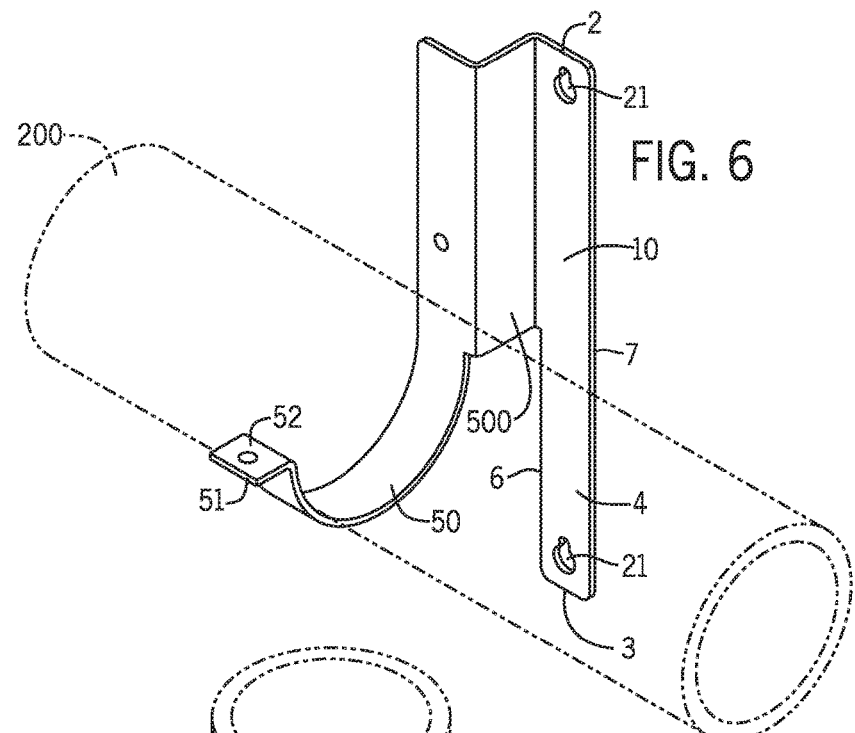
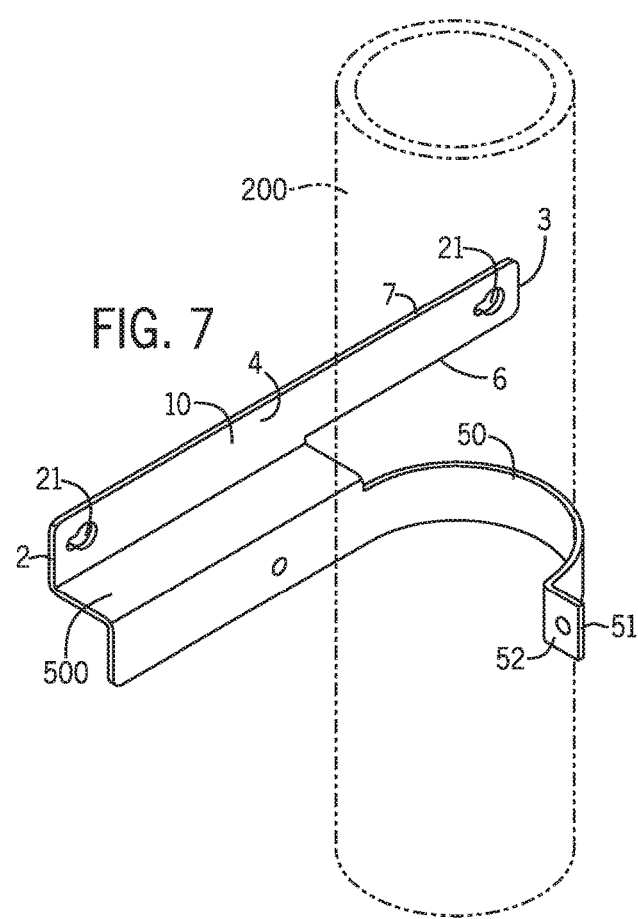

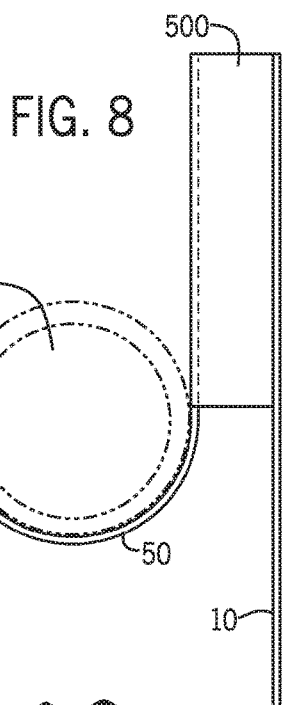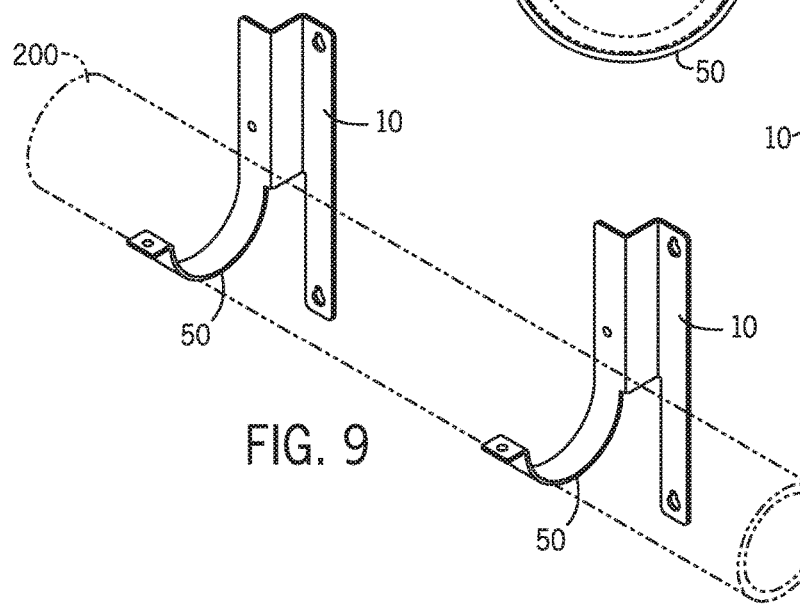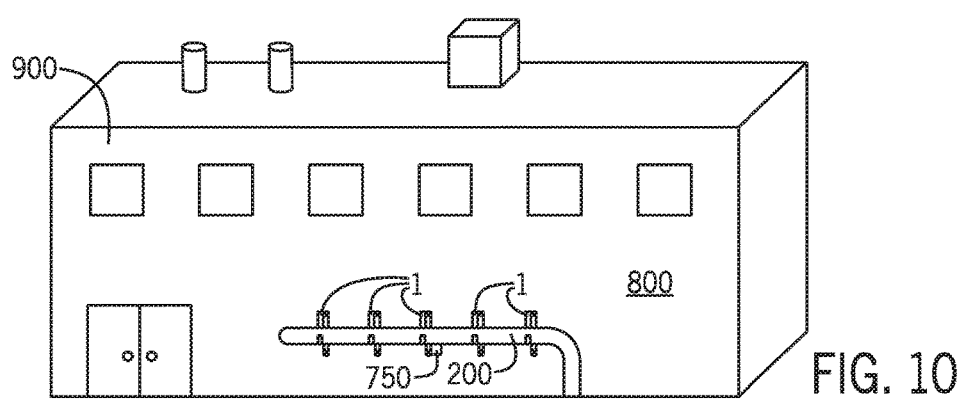

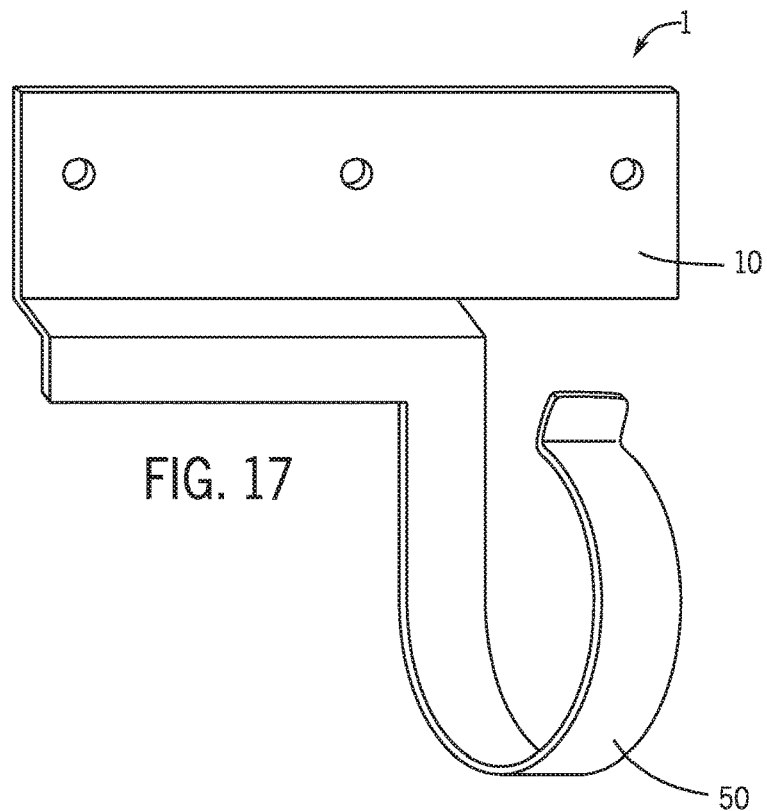
FIG. 17
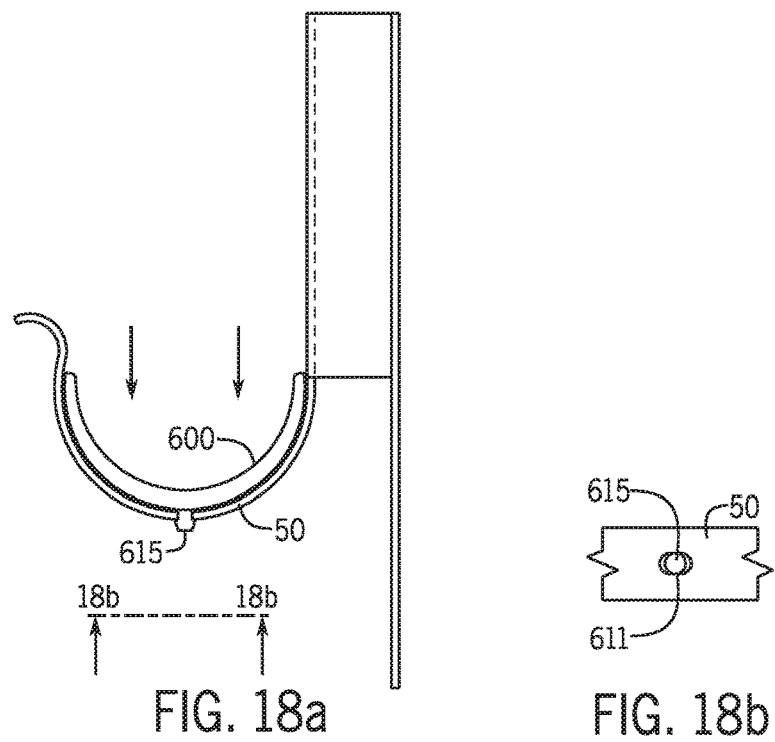
FIG. 18a
FIG. 18b

PIPE SECURING APPARATUS

CROSS REFERENCE TO RELATED APPLICATIONS

The following application is a divisional application is based on U.S. non-provisional application Ser. No. 15/429,435 filed on Feb. 10, 2017 and U.S. provisional application Ser. No. 62/296,678 filed on Feb. 18, 2016 the entire contents of which are incorporated by reference.

BACKGROUND OF THE INVENTION

A device for securing a pipe to a wall, including an exterior wall of a building, is provided. The device has a generally flat surface which adheres to the wall and a generally curved support unit which receives the pipe. An optional securing bar may be locked over the top of the pipe to prevent movement of the pipe. In an embodiment, the device has an extension flange which allows the pipe to be secured to the wall in an off-set manner. Preferably, a plurality of the present aligned devices secure the pipe to the wall in a horizontal or vertical manner. The device allows the pipe to be secured to a wall in compliance with governmental regulations. An adapter unit may be inserted over the curved support unit for one or more smaller pipes.

Attempts have been made to provide a pipe securing apparatus to secure a pipe within a wall of a building. For example, U.S. Pat. No. 6,241,199 to Ismert discloses a protective insulating sleeve having a two part construction with a pair of mating semi-cylindrical halves. Each semi-cylindrical half includes a semi-cylindrical metal sleeve surrounded by a semi-cylindrical plastic sleeve. The semi-cylindrical plastic sleeve has a groove formed in one exposed surface thereof and extending lengthwise along it. The semi-cylindrical metal sleeve extends outward past the semi-cylindrical plastic sleeve to form a tongue which mates with the groove in the other mating semi-cylindrical half such that the mated halves can be inserted into a bore in a stud or joist to receive a pipe or conduit extending through that stud or joist. Cushioning ribs are provided to dampen noise emanating from the pipe or conduit. The interlocked protective insulating sleeve thus serves the plural function of supporting and insulating the pipe or conduit and surrounding it with the metal sleeve to protect it from penetration by nails, screws or other fasteners driven into the stud or joist. The two part construction allows the protective insulating sleeve to be installed in a stud or joist before or after the pipe or conduit has been installed.

Further, U.S. Pat. No. 5,488,198 to Kramer discloses a device for protecting wires and tubes which are placed thru the apertures in building panels or studs made of steel or the like. The protection device disclosed herein includes a single piece, plastic body having a wall surface which is bowed on opposing sides and flanged along its periphery. On opposing sides of the outer surface of the body's wall is arranged a single protruding ridge or a plurality of protruding, angled pins or male nubs which securely hold, in the gap formed between the wall flange and the ridge/male nubs, the opposing rims of an aperture in a metal stud that this device is designed to be securely attached to. The body of this device can be of any size or shape, including but not limited to square, rectangular, oval or cathedral shaped. Due to its elasticity and larger than aperture size, this device can be pinched in along the opposing bowed sides of the body's wall and upon release an outward pressure is achieved against the rims of the stud aperture. The design of the protruding male nubs in relation to the wall flange allows this device to remain firmly attached to the aperture once it is attached thereto.

Further, U.S. Pat. No. 8,424,267 to Cannistraro, et al. discloses an improved protective device for use with a metal stud. This invention protects in-wall piping, conduit and wiring from inadvertent puncturing by drywall screws during the installation of wall boarding.

Still further, U.S. Pat. No. 9,080,691 to the present applicant Bartos discloses a device for securing a pipe within the interior of a wall is provided. The device is especially suitable for quickly and easily securing a pipe within an opening in a stud of a wall. The device has a generally flat surface which adheres to the front of a stud and a grasping portion which secures the pipe on a first end. The device allows the pipe to be secured within a wall in compliance with governmental regulations.

However, these devices for securing a pipe to a wall of a building fail to provide device for securing a pipe to a wall which is easy to use, quick and inexpensive. Further, these devices fail to provide a pipe securing apparatus which easily complies with governmental regulations.

SUMMARY OF THE INVENTION

A device for securing a pipe to a wall, including an exterior wall of a building, is provided. The device has a generally flat surface which adheres to the wall and a generally curved support unit which receives the pipe. An optional securing bar may be locked over the top of the pipe to prevent movement of the pipe. In an embodiment, the device has an extension flange which allows the pipe to be secured to the wall in an off-set manner. Preferably, a plurality of the present aligned devices secure the pipe to the wall in a horizontal or vertical manner. The device allows the pipe to be secured to a wall in compliance with governmental regulations. An adapter unit may be inserted over the curved support unit for one or more smaller pipes.

An advantage of the present device is that the present device is easily secured to a wall, including an exterior wall of a building.

And another advantage of the present pipe securing device is that the present device may secure multiple various-sized pipes in the same unit, including customized pipes for gas, water, electrical, air vents, HVAC and the like.

In yet another embodiment, the device may have at least one sensor which detects problematic issues with, for example, water leaks, gas leaks, low or high temperatures, air flow problems, changes in humidity, etc.

In still another embodiment, the device may have an optional adapter unit which is secured over the curved support unit and allows for the device to secure smaller pipes.

An advantage of the present device is that a plurality of aligned devices may allow the pipe to be secured to the wall of a building in a vertical or horizontal manner.

Still a further advantage of the device is that the present device is light-weight and easy to install.

Yet another advantage of the present device is that the present device, in an embodiment, may be constructed from a single unit with no moving parts.

And yet another advantage of the present device is that the present device may be used to secure pipes of various sizes.

A further advantage of the present device is that the present device may secure a pipe to a wall with a single or with few nails, screws, bolts, etc.

Yet another advantage of the present device is that the present device may allow for easy compliance with governmental regulations.

Still another advantage of the present device is that the present device has an optional securing bar which locks the pipe into the device.

Finally, an advantage of the present pipe securing device is that the present device allows a pipe to be secured to the wall of a building in an off-set manner; therein allowing access to the back of the pipe for maintenance.

For a more complete understanding of the above listed features and advantages of the present pipe securing device reference should be made to the following detailed description of the preferred embodiments. Further, additional features and advantages of the invention are described in, and will be apparent from, the detailed description of the preferred embodiments.

BRIEF DESCRIPTION OF THE DRAWINGS

FIG. 1 illustrates a perspective view of the pipe securing device.

FIG. 2 illustrates a side view of the pipe securing device.

FIG. 6 illustrates a perspective view of the device wherein a pipe is secured therein.

FIG. 7 illustrates a perspective view of the device with a pipe secured therein wherein the device is in a vertical orientation.

FIG. 8 illustrates a side view of the pipe securing device with the pipe secured therein.

FIG. 9 illustrates a plurality of devices aligned to secure a pipe.

FIG. 10 illustrates a plurality of devices securing a pipe on the exterior wall of a building.

FIG. 17 illustrates an alternative embodiment wherein the curved support unit is at a right angle with respect to the back plate.

FIGS. 18a and 18B illustrate an embodiment wherein the adapter unit snaps into an opening of curved support unit.

DETAILED DESCRIPTION OF THE PREFERRED EMBODIMENTS

Figure 3:
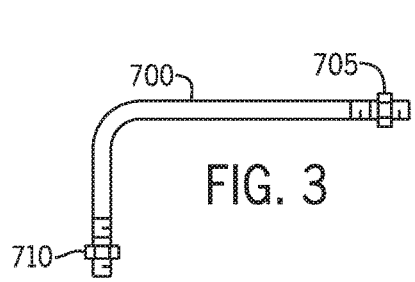
FIG. 3 illustrates a side view of the optional securing bar of the pipe securing device.
Figure 4:
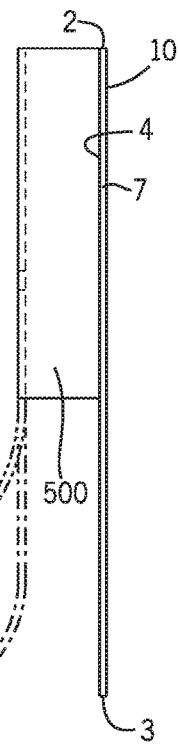
FIG. 4 illustrates a side view of the various embodiments of the curved support unit of the pipe securing device.

A device for securing a pipe to a wall, including an exterior wall of a building, is provided. The device has a generally flat surface which adheres to the wall and a generally curved support unit which receives the pipe. An optional securing bar may be locked over the top of the pipe to prevent movement of the pipe. In an embodiment, the device has an extension flange which allows the pipe to be secured to the wall in an off-set manner. Preferably, a plurality of the present aligned devices secure the pipe to the wall in a horizontal or vertical manner. The device allows the pipe to be secured to a wall in compliance with governmental regulations. An adapter unit may be inserted over the curved support unit for one or more smaller pipes.

Referring now to the drawings, FIG. 1 illustrates the present pipe securing device 1 for securing the same to a wall 800 (FIG. 10) of a building 900. The pipe securing device 1 is preferably constructed of a single unit of lightweight metal and may generally resemble a "J." It should be understood that the device 1 may be made of any suitable material. The pipe securing device 1 is especially suitable for securing a pipe 200 (FIG. 9) to the wall 800 of a building 900. The wall 800 may be an interior wall or an exterior wall 800 of the building 900. The pipe 200 may have an interior channel 223 for transporting a gas or liquid.

Figure 5:
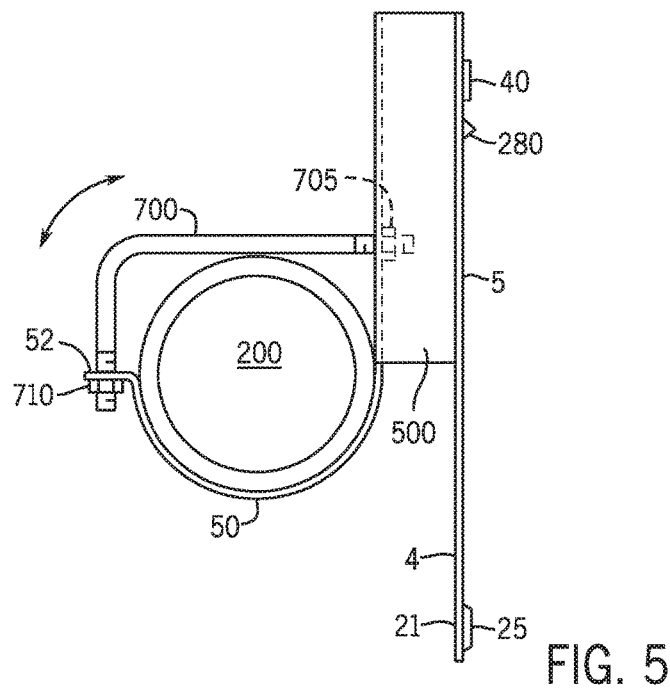
FIG. 5 illustrates a side view of the pipe securing device with the pipe secured therein and the optional securing bar locked over the pipe.

The device 1 may have a plurality of parts including a back plate 10, a curved support unit 50, in an embodiment, an extended ridge portion 500 and, in an embodiment, a locking bar 700 (FIG. 5). In one embodiment, the back plate 10 may be the portion of the device 1 secured to the wall 800 of the building 900. The back plate 10 may have a top 2, a bottom 3, a front 4, a back 5 (FIG. 5), a first side 6 and a second side 7. The front 4 of the device 1 may be, for example, generally rectangular having a length 11 and a width 12. In an embodiment, the curved support unit 50 may secure multiple pipes in the same unit.

Figure 14:
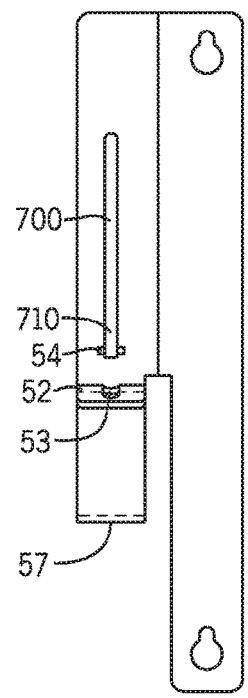
FIG. 14 illustrates a front view of the optional locking mechanism of the locking bar of the device.

FIG. 14 illustrates a front view of the optional locking bar 700 of the device 1. In an embodiment having the optional locking bar 700, the front 710 of the locking bar 700 may have a rotating "T" lock 54. The rotating "T" lock 54 may be secured into an opening 53 of an extension tab 52 (discussed below) of the curved support unit 50. Once the pipe 200 is secured on the curved support unit 50, the locking bar 700 may be brought downward, and the rotating "T" lock 54 rotated in the opening 53 so as to lock the locking bar 700 to the curved support unit 50 with the pipe 200 secured therein. When locked together, the pipe 200 is completely surrounded at a cross section at the point the optional locking bar 700 passes over the device 1.

The front 4 of the device 1 may have at least one opening 21. FIG. 1 illustrates the front 4 of the device 1 having two openings 21; however, the front 4 of the device 1 may have any number of openings 21 so as to properly secure the device 1 to the wall 800. In an embodiment, the back 5 of the device 1 may have an adhesive 40 (FIG. 5) which may further help secure the device 1 to the wall 800. Once the device 1 is aligned in place on the wall 800, the user may then insert a nail, screw 24 or the like into the openings 21 on the back plate 10 of the device 1. As a result, the device 1 is then secured to the wall 800 and is prevented from moving. After properly securing a pipe 200 to the wall 800 by use of the device 1, the user may repeat the process by inserting additional devices 1 along the length of the wall 800.

In an embodiment, the openings 21 of the back plate 10 of the device 1 may be located near the top 2 and near the bottom 3 of the back plate 10 of the device 1 such that the screws or nails 24 inserted into the openings 21 will not strike and damage the pipe 200 passing between them and so that the nails, screws or the like 24 are further accessible while the pipe 200 is secured within the device 1 on the wall 800.

In an embodiment, the back 5 of the device 1 may have at least one protrusion 280 (FIG. 5). In an embodiment, the protrusion 280 may be a triangular spike which is partially cut out and bent back from the back plate 10 of the device 1. The protrusion 280 may be partially inserted and may dig into the interior of the wall 800 similar to a nail 24 so that the device 1 does not move (once inserted) with respect to the wall 800. In an embodiment, the protrusions 280 may be used instead of a nail or screw 24. More specifically, the protrusion 280 may electively act as the main securing mechanism to secure the device 1 to the wall 800.

Openings in the back plate 10 for the protrusion 280 may also be used to visually examine a portion of the wall 800 behind the device 1 so as a user may align the opening of the device 1 with predetermined marks already located on the front of the wall 800 so as to properly position the device 1 for use.

In an embodiment, the openings 21 have a diameter 22 (FIG. 1) which is slightly larger than the diameter of a standard screw or nail 24 so that the screw or nail 24 snuggly fits into the opening 21. Further, in an embodiment, the opening 21 may have a recessed lip portion 25 (FIG. 5) which extends toward the back 5 of the device 1 therein increasing surface area for the device 1 to contact the screw or nail 24 and to further provide additional surface area to contact the wall 800.

In an embodiment, the device 1 may have an extended ridge section 500. The extended ridge section 500 maybe secured to, for example, the back plate 10. The extended ridge section 500 may be generally rectangular, extending perpendicularly outward from the back plate 10 and may allow the curved support unit 50 to be extended away from the wall 800. More specifically, the extended ridge section 500 may allow the pipe 200 to be secured away from the wall 800 so that a utility worker may provide cleaning and maintenance of the pipe 200 more easily without the need to remove the pipe 200 from the device 1 or the wall 800.

In an embodiment, the curved support unit 50 may be secured to the extended ridge section 500. The curved support unit 50 may be slightly flexible so as to grasp and secure a pipe 200 while in use. In an embodiment, the curved support unit 50 may extend greater than half-way (greater than one hundred and eighty degrees) around the pipe 200. A distal end 51 (FIG. 1) of the curved support unit 50 may have an extension tab 52 which allows a user to more easily pull the curved support unit 50 away from the wall 800 so as to temporarily increase the diameter 55 of an opening which receives the pipe 200. Once the pipe 200 is in place on the curved support unit 50, the tab 52 may be released and the device 1 may more easily grasp the pipe 200 (by, for example, friction).

Referring now to FIG. 5, as stated above, in an embodiment, the device 1 may have an optional securing bar 700. The optional securing bar 700 may secure the pipe 200 within the curved support unit 50 from the top, so as the pipe 200 may not be easily removed from the curved support unit 50. A hinge 705 may allow the optional securing bar 700 to rotate upward and downward. Once the pipe 200 is secured within the curved support unit 50, the optional securing bar 700 may be rotated downward at the hinge 705 and locked onto the curved support unit 50 at the extended tab 52 (as described above). To remove, replace or provide maintenance to the pipe 200, the optional securing bar 700 may be rotated upward so as to free the pipe 200.

Figure 15:
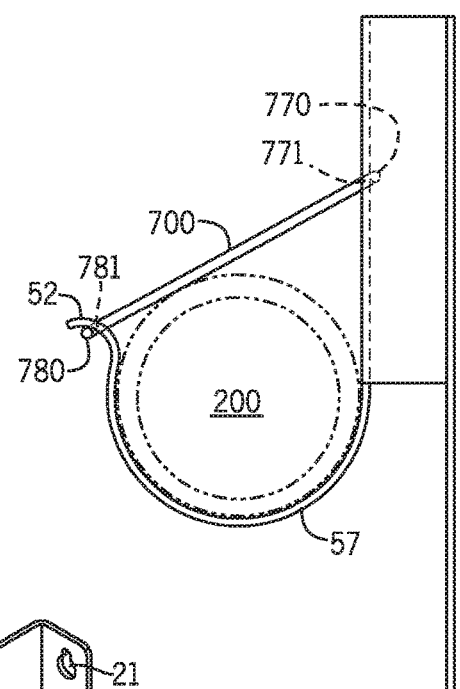
FIG. 15 illustrates an alternative view of the device wherein an alternative optional securing bar is used.

In an alternative embodiment illustrated in FIG. 15, the optional securing bar 700 may simply be a generally cylindrical rod which is inserted over the top of the pipe 200 and wherein the optional securing bar 700 has a first end 770 which is received in an opening 771 on the back surface of the curved support unit 50 and a second end 780 which is received in a second opening 781 on the extension tab 52 of the curved support unit 50 and wherein the optional securing bar 700 is locked into place over the pipe 200 by, for example, bolts (not shown).

Figure 13:
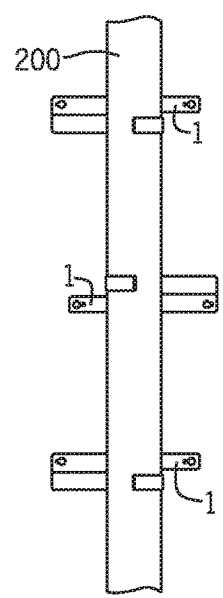
FIG. 13 illustrates a vertical assembly wherein a plurality of devices are alternatively aligned.

In an embodiment, a plurality of devices 1 may form a system wherein the system may be used to secure a pipe 200 in, for example, a vertical (FIG. 7) or horizontal (FIG. 10) orientation. A vertical configuration is especially suitable for a downspout pipe from a gutter. In the vertical configuration, a plurality of devices may be secured in altering configurations (180 degrees rotated from each other) so that the open end of the curved support unit 50 extends to the right in one device 1 and to the left in a neighboring device (see FIG. 13). Still further, the device 1 may further be mounted easily on a ceiling.

Figure 11:
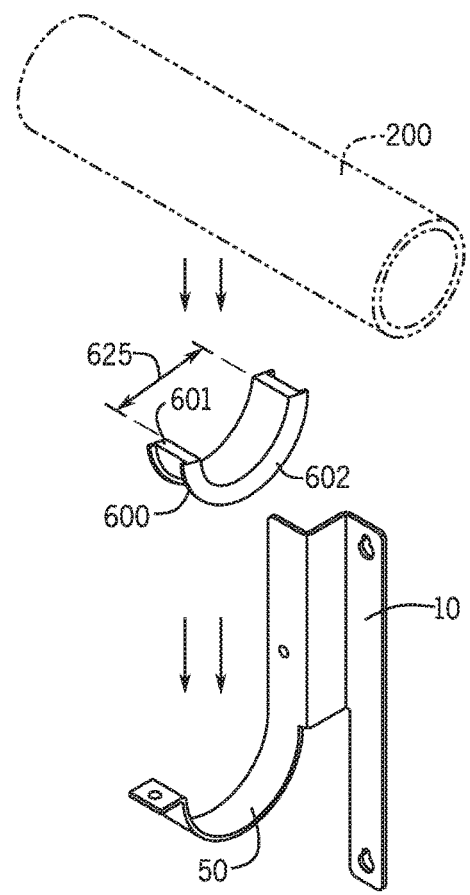
FIG. 11 illustrates a perspective view of an embodiment of the device wherein an adapter unit is used in connection with the curved support unit for smaller pipes.
Figure 12:
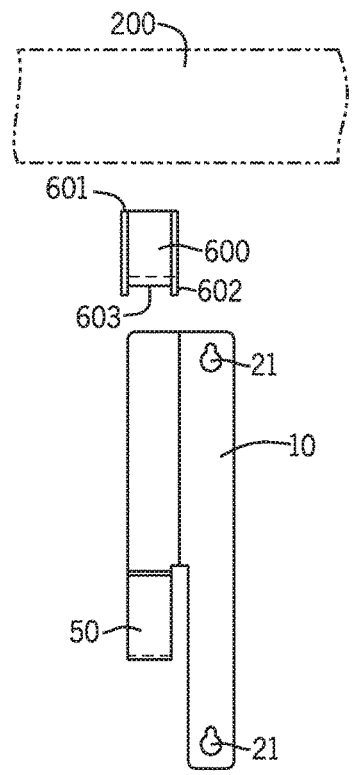
FIG. 12 illustrates a front view of the adapter unit being secured on the curved support unit.

Referring to FIGS. 11 and 12, although the device 1 is generally capable of securing various sized pipes, in certain circumstances, use of an adapter unit 600 may be desired. The adapter unit 600 may be generally curved shaped having a top end 601 end and a bottom end 602. The bottom end 602 may have a lower curve 603 which may wrap around and rest on the curved support unit 50 whereas the top end 601 may receive the pipe 200. In particular, the lower curve 603 may extend on both sides of the curved support unit 50 and may snap into place on the curved support unit 50. In particular, the lower curve 603 of the adapter 600 may be slightly smaller than a width of the curved support unit 50 such that the adapter 600 slightly stretches when placed on the curved support unit 50 and remains secured to the same via friction. In another embodiment, the adapter 600 may be secured to the curved support unit 50 by means of pins (not shown) or other devices. In yet another embodiment, the adapter 600 may be magnetic and therein attracted to the curved support unit 50 (which may be metal) so as to provide greater adherence to the device 1. Because the adapter 600 has a diameter 625 which is less than the normal diameter 55 of the curved support unit 50, the adapter 600 is better suitable for securing a pipe 200 (or multiple pipes) having a smaller diameter.

In an embodiment, the device 1 may have at least one sensor 750 (FIG. 10). The sensor(s) 750 may be embedded into the device 1. The sensor(s) 750 may be able to detect water leaks, gas leaks, temperature changes (to prevent freezing), air flow issues, changes in humidity, etc. The sensor(s) 750 may be MEMS devices (microphones, gyroscopes, pressure sensors, temperature sensors, humidity sensors, etc) and could communicate wirelessly with a computer accessible by building maintenance. The sensor(s) 750 may be powered by AC power, DC power, inductive means, solar or the like or may use the flow of the gas, water, air, etc through the pipes 200 to power the sensor(s) 750. An automatic shut-off of, for example, gas, water and/or electric power may be incorporated and triggered in the event the sensor(s) 750 detect a dangerous or problematic issue. In an embodiment, the sensor(s) 750 may be mounted directly underneath where the pipe 200 contacts the curved support unit 50 (or the adapter 600) so that the sensor(s) 750 directly contact the pipe 200 for better readings, especially for temperature.

Referring now to FIG. 17, in yet an alternative embodiment, the curved support unit 50 is at a right angle with respect to the back plate 10. This allows securing of the device 1 to horizontal beams as opposed to vertical beams. Further, this bracket allows installation of pipes closer to the ceiling if there is not a vertical support member.

Referring now to FIGS. 18*a* and 18*b*, in an alternative embodiment, the adapter unit 600 may have an extended peg 615. The extended peg 615 may snap into an opening 611 located on the bottom of the curved support unit 50 (as illustrated in FIG. 18*b*). In particular, the extended peg 615 may have a diameter which is slightly greater than a diameter of the opening 611 of the curved support unit 50 so as to lock the adapter unit 600 to the curved support unit 50.

Figure 19:
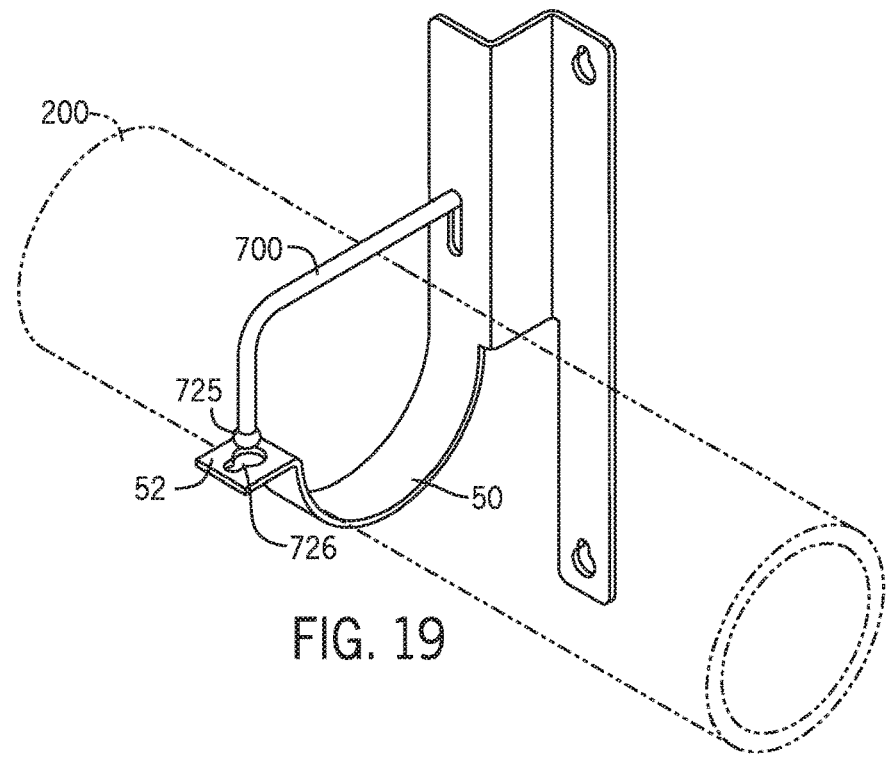
FIG. 19 illustrates an alternative embodiment of locking the optional locking bar to the curved support unit.
Figure 20B:
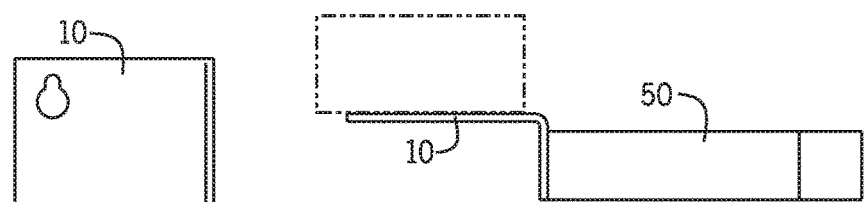
FIGS. 20a and 20b illustrate an alternative embodiment of the configuration of the device.
Figure 20A:
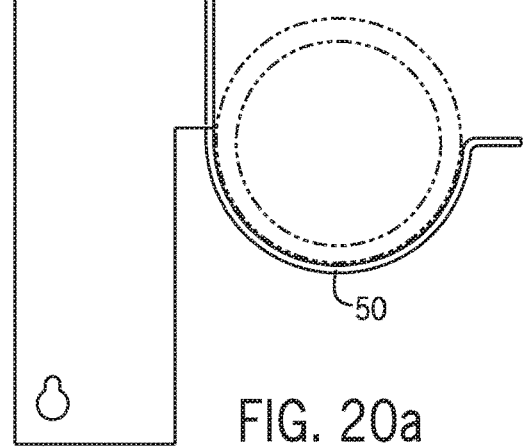

Referring now to FIG. 19, in an alternative embodiment, the optional locking bar 700 may have an extended knob 725. The extended knob 725 may temporarily allow the optional locking bar 700 to lock into an opening 726 of the extension tab 52 of the curved support unit 50. In particular, the opening 726 of the extension tab 52 may be generally key-hole shaped such that a user slightly bends the optional locking bar 700 forward so that the extended knob 725 fits in the large portion of the opening 726 and then releases the pressure so that the extended knob 725 moves beneath the skinny portion of the opening 726 and remains in place until a user elects to remove the optional locking bar 700 from the curved support unit 50 by reversing the process.

Figure 16:
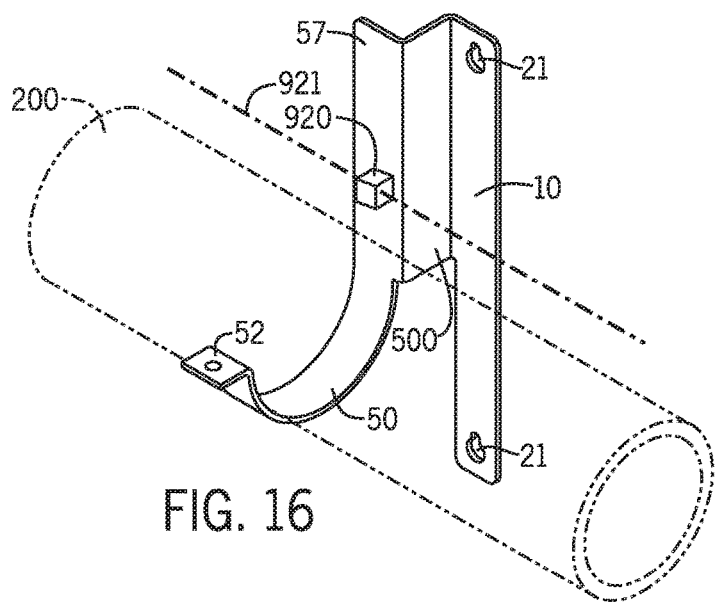
FIG. 16 illustrates an alternative embodiment of the device wherein a laser level is utilized.

In an embodiment, the device 1 may have a laser projector 920 (FIG. 16). The laser projector 920 may emit a laser beam 921 which allows the device 1 to be properly leveled with respect to a wall 800. Thus, installation of the pipes 200 becomes easier.

Figure 21:
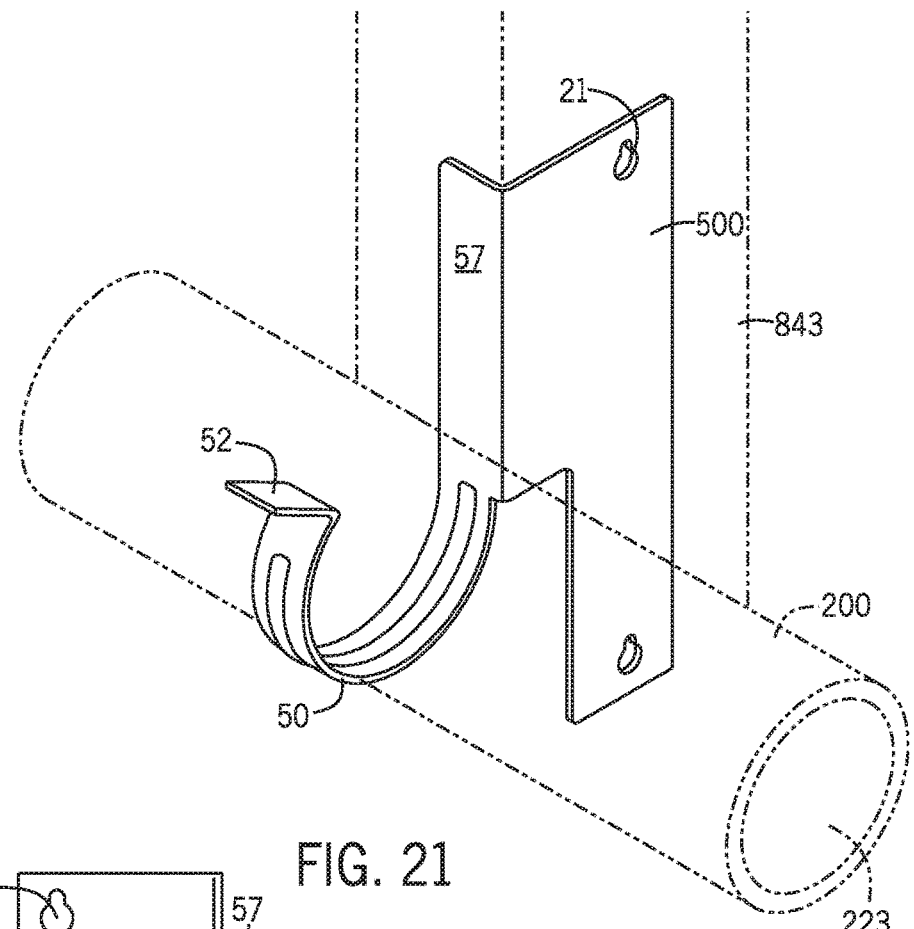
FIG. 21 illustrates a perspective view of an alternative embodiment wherein the device only has an extended ridge portion and not a back plate.
Figure 22:
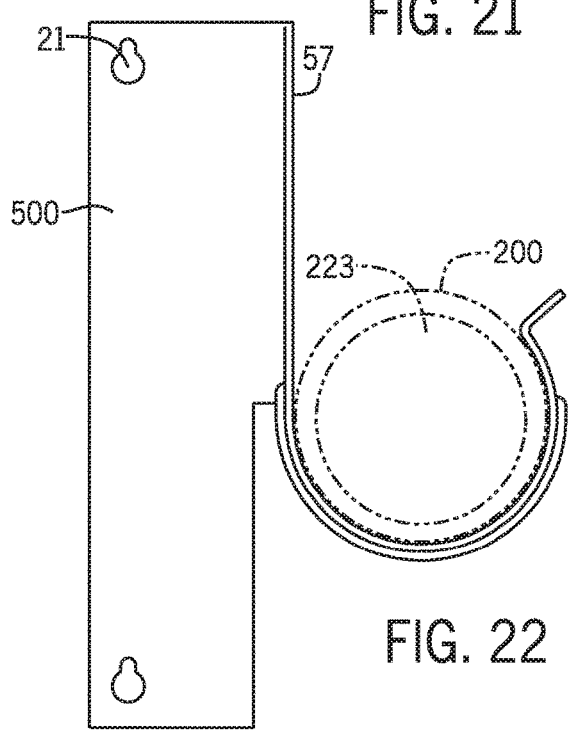
FIG. 22 illustrates a side view of the embodiment of FIG. 21.

Finally, referring now to FIGS. 21 and 22, in an embodiment the device 1 may lack a back plate 10. In this embodiment, the device 1 is especially suitable for being secured to a wood stud 843. In particular, a generally rectangular back portion 57 of the device 1 (attached directly to and part of the curved support unit 50) may be connected to the extended ridge portion 500 such that the generally rectangular back portion 57 and the extended ridge portion 500 may each directly contact the wood stud 843 (it should be noted that the device 1 may be secured to concrete or any other suitable material). In this embodiment, the device 1 may be attached on side of the wood 843 (for example, a 2×4) which may be close to, for example, a concrete wall etc. When a small gap is present between two walls of the same or different buildings, the present device 1 is suitable to be mounted between the two walls.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

The invention claimed is:

1. A pipe securing apparatus comprising:
   a generally rectangular brace having a front having a length, a back, a first side, a second side, a top, and a bottom wherein the back of the generally rectangular brace is secured to a wall;
   a rectangular panel extending from the first or second side of the generally rectangular brace wherein the rectangular panel is at a right angle with respect to the generally rectangular brace;
   an extended support unit secured at a right angle to the opposing side of the rectangular panel as the generally rectangular brace wherein the extended support unit has a length less than the length of the generally rectangular brace and wherein the extended support unit has a generally rectangular front portion and a generally curved bottom end;
   wherein the front of the extended support unit is parallel to the front of the generally rectangular brace;
   wherein the generally curved bottom end of the extended support unit is arraigned to partially secure a pipe;
   a movable locking bar secured to the extended support unit wherein the movable locking bar moves from a first position to a second position and wherein the movable locking bar secures the pipe within the extended support unit in the second position and allows the pipe to be removed from the extended support unit in the first position; and
   a sensor attached to the generally rectangular brace wherein the sensor detects leaks or pressure, temperature or humidity changes which occur around the pipe.

\* \* \* \* \*